(12) United States Patent
Eustace

(10) Patent No.: US 7,000,188 B1
(45) Date of Patent: Feb. 14, 2006

(54) SYSTEM AND METHOD FOR INTELLIGENTLY SELECTING MEDIA THROUGH A SIMPLIFIED USER INTERFACE

(75) Inventor: Robert Alan Eustace, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 209 days.

(21) Appl. No.: 09/823,081

(22) Filed: Mar. 29, 2001

(51) Int. Cl.
*G09G 5/00* (2006.01)

(52) U.S. Cl. .................. 715/716; 715/811; 715/812; 715/864

(58) Field of Classification Search .............. 715/716, 715/719, 720, 727, 738, 739, 744, 745, 810, 715/811, 812, 844, 864
See application file for complete search history.

(56) References Cited

U.S. PATENT DOCUMENTS

| | | | | |
|---|---|---|---|---|
| 4,611,996 A | * | 9/1986 | Stoner | 434/202 |
| 4,841,506 A | * | 6/1989 | Kiyoura et al. | 369/178.01 |
| 5,583,763 A | * | 12/1996 | Atcheson et al. | 707/3 |
| 5,616,876 A | * | 4/1997 | Cluts | 84/609 |
| 5,633,985 A | * | 5/1997 | Severson et al. | 704/267 |
| 5,749,081 A | * | 5/1998 | Whiteis | 707/102 |
| 6,248,946 B1 | * | 6/2001 | Dwek | 84/609 |
| 6,574,616 B1 | * | 6/2003 | Saghir | 707/1 |
| 6,662,231 B1 | * | 12/2003 | Drosset et al. | 709/229 |
| 2002/0138630 A1 | * | 9/2002 | Solomon et al. | 709/228 |

* cited by examiner

*Primary Examiner*—John Cabeca

(57) ABSTRACT

The present invention is a media player and media player interface. The media player includes a storage unit for various types of media, media related data, and media selection logic. The media player interface is either built into the media player or a separate component such as a remote control. Either way, the media player interface includes a single point interface. When the single point interface is triggered by a user, the media selection logic selects an item of media by reference to the media related data. The media related data includes information that determines the probability of a particular item of media being selected by the media selection logic. The act of triggering the single point interface provides the media selection logic with information to update the media related data. The media selection logic may also consider the current sequence of selections, so that a single item is not likely to be selected back-to-back.

64 Claims, 3 Drawing Sheets

SYSTEM AND METHOD FOR INTELLIGENTLY SELECTING MEDIA THROUGH A SIMPLIFIED USER INTERFACE

The present invention relates generally to media players and media player interfaces, and particularly to intelligent media selection logic for media players.

BACKGROUND OF THE INVENTION

Computer systems traditionally use keyboards and pointer mechanisms to allow users to select among a set of items. Some hand held devices (e.g., Palm Pilots) use touch sensitive LCD screens. Other small digital devices, such as personal digital assistants ("PDA's", e.g., REX) and cellular telephones, use an LCD and up/down switches or numeric keypads to allow users to select among a set of items.

Keyboards and traditional pointer mechanisms (e.g., a track ball or mouse) are far too large for use when space is at a premium or portability is required. Touch sensitive LCD's are power-hungry, expensive, hard to interface with, and do not scale well as devices become very small.

Small and inexpensive user interfaces are typically found on devices that present users with only a small number of well defined choices. For example, the "scan" button of many car radios allows a user to select from available radio stations. Pressing this button causes the radio to search through the AM or FM band for the next station with a signal strength that exceeds some threshold. Additional pushes on the scan button will continue to search the band, eventually returning to the original station (assuming the radio remains in the same area). A problem with the scan button is that it is completely deterministic. The same sequence of stations is selected by repeated pushes of the scan button. Unfortunately, this determinism sacrifices a large amount of potentially useful information. Although the scan button has the virtues of small size and low cost, it is not configured to learn from past scans to improve the selection process.

If there are hundreds or thousands of selection choices, interfaces such as the scan button break down completely. Consider a portable MP3 player with the songs (i.e., recordings of musical compositions) of a thousand compact disks (CD's) burned into its ROM. Clearly, a simple scan button is not sufficient, and yet the device is too small for a complex array of buttons and an appropriately sized LCD sufficient to facilitate a suitable user selection mechanism.

Therefore, there is needed a system and method that allows a user to select from hundreds or thousands of choices using a small and inexpensive interface.

SUMMARY OF THE INVENTION

In summary, the present invention is a media player and media player interface. The media player includes a storage unit for various types of media, media related data, and media selection logic. The media player interface is either built into the media player or a separate component such as a remote control. The media player interface may include a single point interface. For example, the single point interface may be a button or a microphone. When the single point interface is triggered by a user (e.g., a user presses a button or vocalizes a command), the media selection logic selects an item of media by reference to the media related data. The media selection logic may itself trigger the selection of an item of media under certain circumstances. The media related data includes information that determines the probability of a particular item of media being selected by the media selection logic. The act of triggering the single point interface provides the media selection logic with information to update the media related data. For example, if a user triggers a selection in less time than the duration of the previously selected item, the media selection logic decreases the probability of the previously selected item of media and related items of media being selected in the future.

In another aspect of the present invention, the media selection logic also considers the sequence of media items that have already been selected. For example, if a particular item of media was just selected, the probability of that item being selected in the near term is reduced or eliminated.

Another aspect of the present invention includes interfacing with a separate device in order to obtain favored items of media as indicated by the media related data.

Yet another aspect of the present invention is a computer program product for use in a computer controlled media player having a central processing unit and a storage unit for storing media and media related data. A media selection module, executable by the central processing unit includes instructions that are responsive to trigger signals received from an interface of the media player for selecting items of the media by reference to said media related data. The media selection module also has instructions for updating the media related data in accordance with the items of media selected by the media selecting instructions.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
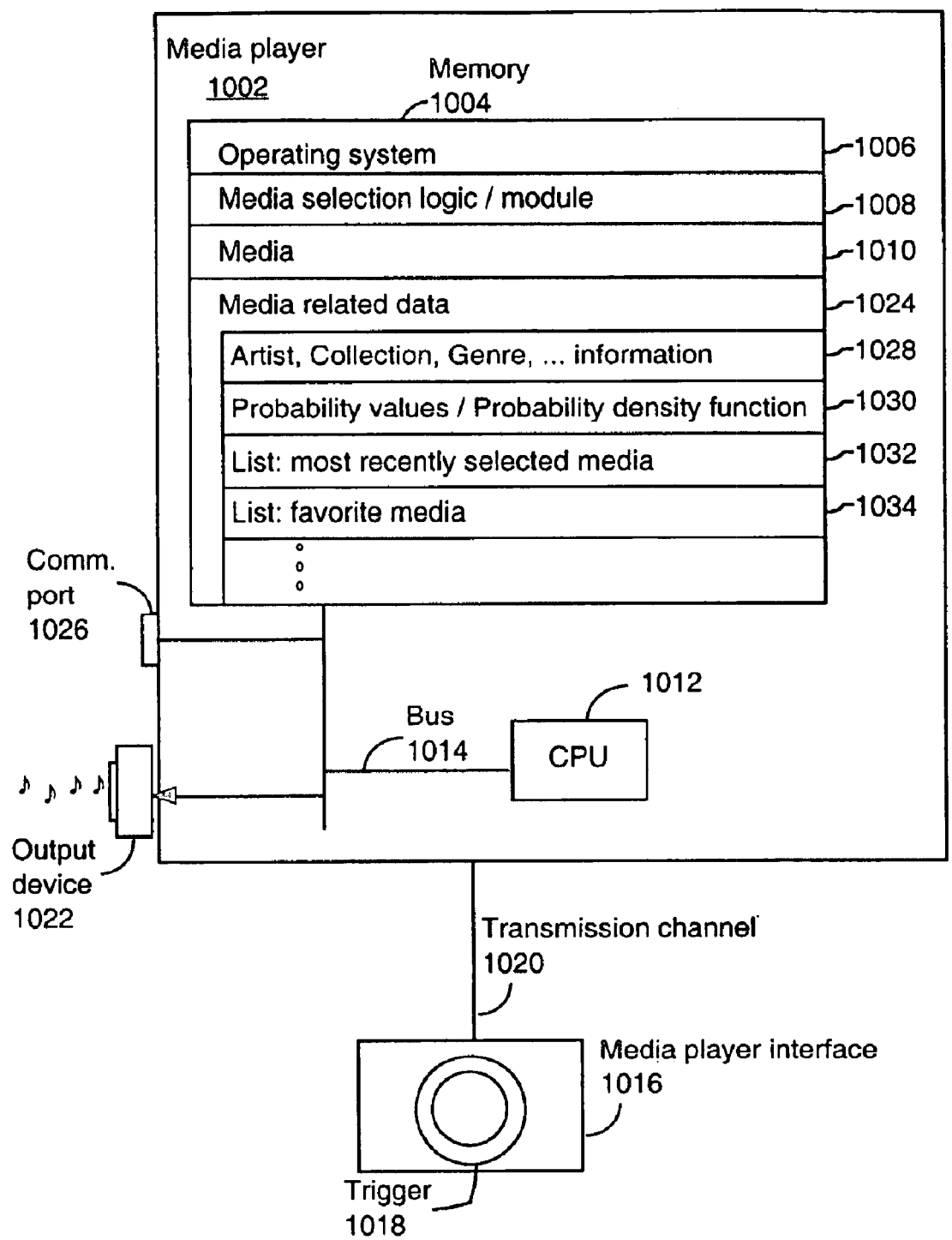
FIG. 1 is a block diagram of a media player and media player interface capable of enabling an embodiment of the invention.

Referring to FIG. 1, there is shown media player 1002, which includes memory 1004, central processing unit (CPU) 1012, output device 1022, comm. port 1026, and bus 1014, which inter-connects the aforementioned components. Memory 1004 typically includes high speed random access memory as well as non-volatile memory, such as EEPROM and/or hard disk storage. The memory 1004 preferably stores an operating system 1006, media selection logic 1008, and media 1010. Media selection logic 1008, also called the media selection module, is executed by the CPU 1012, and has instructions to perform the steps illustrated in FIGS. 2A–2B and 3. Operating system 1006 encompasses software, firmware, and/or hardware logic configured to perform basic system functions. The operating system 1006 may include procedures for performing functions such as storing and retrieving the media and media related data from memory 1004, decoding digitally encoded media such as music and/or video, displaying information on a display device such as an liquid crystal display (LCD), keeping track of the current date and time, keeping track of the duration of various events, and so on.

Media 1010 includes data such as encoded music and video or television and radio station listings. Media related data 1024 includes descriptions of media 1010. For example, if media 1010 is encoded music, media related data 1024 includes artist names, album names, music genre, and other descriptive information 1028 for each item of media. Media related data 1024 also includes information, such as an identifier of the most recently selected item of media 1010 and the time and date of the selection.

In some embodiments, media related data 1024 also includes a selection probability for each item of media 1010. The selection probability defines the likelihood of selecting a particular item of media 1010. This aspect of media related data 1024 is preferably initialized to a midway point between the highest and lowest selection probability values. In some embodiments, the sum of the selection probability for all item of media 1010 is normalized to 1; but in other embodiments the selection probability of each item of media 1010 is required only to fall within a specified range (e.g., 0 to 1). In these embodiments, the selection probability of items of media 1010 are adjusted without regard to the selection probability of other items of media 1010. The selection probabilities of all the items of media 1010 are collected together to form a probability density function 1030.

In other embodiments of the invention, media related data 1024 includes information about a range of selections (preferably all of them). For example, media related data 1024 may include a list 1032 of the N most recently selected media, where N is an integer such as 1, 3, 5 or 10. The media selection logic 1008 is configured in some embodiments to avoid selecting any of the media included in this list 1032. Also included in media related data 1024 of some embodiments is list 1034, which includes items of media 1010 that have been heuristically determined to be the "favorite" items of media 1010 of a user of media player 1002. In these embodiments, media selection logic 1008 analyzes this data to make selections.

CPU 1012 provides the processing power needed by media selection module 1008 to select media in accordance with various embodiments of the invention. In an audio media player implementation, such as a portable MP3 player, output device 1022 comprises an audio speaker or speaker jack. The audio speaker or speaker jack enables a user to listen to songs that form media 1010. In video media player implementations, output device 1022 comprises a display device and audio speakers, or video and audio output jacks.

Comm. port 1026 enables the transfer of media 1010 and media related data 1024 to and from media player 1002. Those skilled in the art recognize that devices such as media player 1002 typically include additional components. However, any additional components are not critical to this invention, and are thus not illustrated.

There is also illustrated in FIG. 1 a media player interface 1016 and transmission channel 1020. Included in media player interface 1016 is trigger 1018. In the embodiment illustrated in FIG. 1 trigger 1018 takes the form of a button—not necessarily unlike buttons found on common television remote controls. In other embodiments, trigger 1018 is a microphone that works in conjunction with common voice recognition technology to enable a user to initiate a selection by media selection logic 1008 using a voice command. In some embodiments, the interface 1016 may include more than one button or trigger 1018. However, in the primary embodiments discussed below, trigger 1018 is either the only way or a primary way that users initiate a selection by media selection logic 1008. As more fully described below, the configuration of media selection logic 1008 eliminates any need for additional components such as LCD's and additional buttons in the selection process. Nevertheless, the present invention can also be used in systems in which a more complex set of buttons or other input devices are also available to the user, for instance in a handheld remote control device. In such embodiments, the trigger 1018 remains an "intelligent scan" button or trigger, providing a simple but intelligent interface for selecting media.

In the embodiment illustrated in FIG. 1, media player interface 1016 is a component separate from media player 1002. Thus, media player interface 1016 comprises a type of remote control. To illustrate the connection between media player interface 1016 and media player 1002 there is shown transmission channel 1020. Transmission channel 102 can take many forms. For example, in some embodiments transmission channel 1020 comprises a wire that physically connects media player interface 1016 to media player 1002. In other embodiments, wireless technology such as that found in common television remote control devices is used to connect the interface 1016 to the media player 1002. As with components of media player 1002 not illustrated in FIG. 1, the specific wireless technology utilized in media player 1002 and media player interface 1016 is not important to the present invention.

Other embodiments of the present invention incorporate media player interface 1016 into media player 1002. In these embodiments, trigger 1018 is in effect disposed on media player 1002. In such embodiments, media player interface 1016 and transmission channel 1020 are components of media player 1002.

The general nature of the hardware components that comprise this invention has now been disclosed. Our attention next turns to a description of processing steps included in a preferred embodiment of the invention.

As mentioned above, media related data 1024 may include selection probability data 1030 for each item of media. Each time a selection is initiated by a user, media selection logic 1008 updates a selection probability for each item of media related to the previous selection. For example, if a second selection is initiated in less time than the duration of the item of media 1010 selected in a first selection, the selection probability of that item of media 1010 and each related item of media 1010 is reduced. Once the selection probabilities have been adjusted, a random number is used to select an item of media as described below.

Figure 2A:
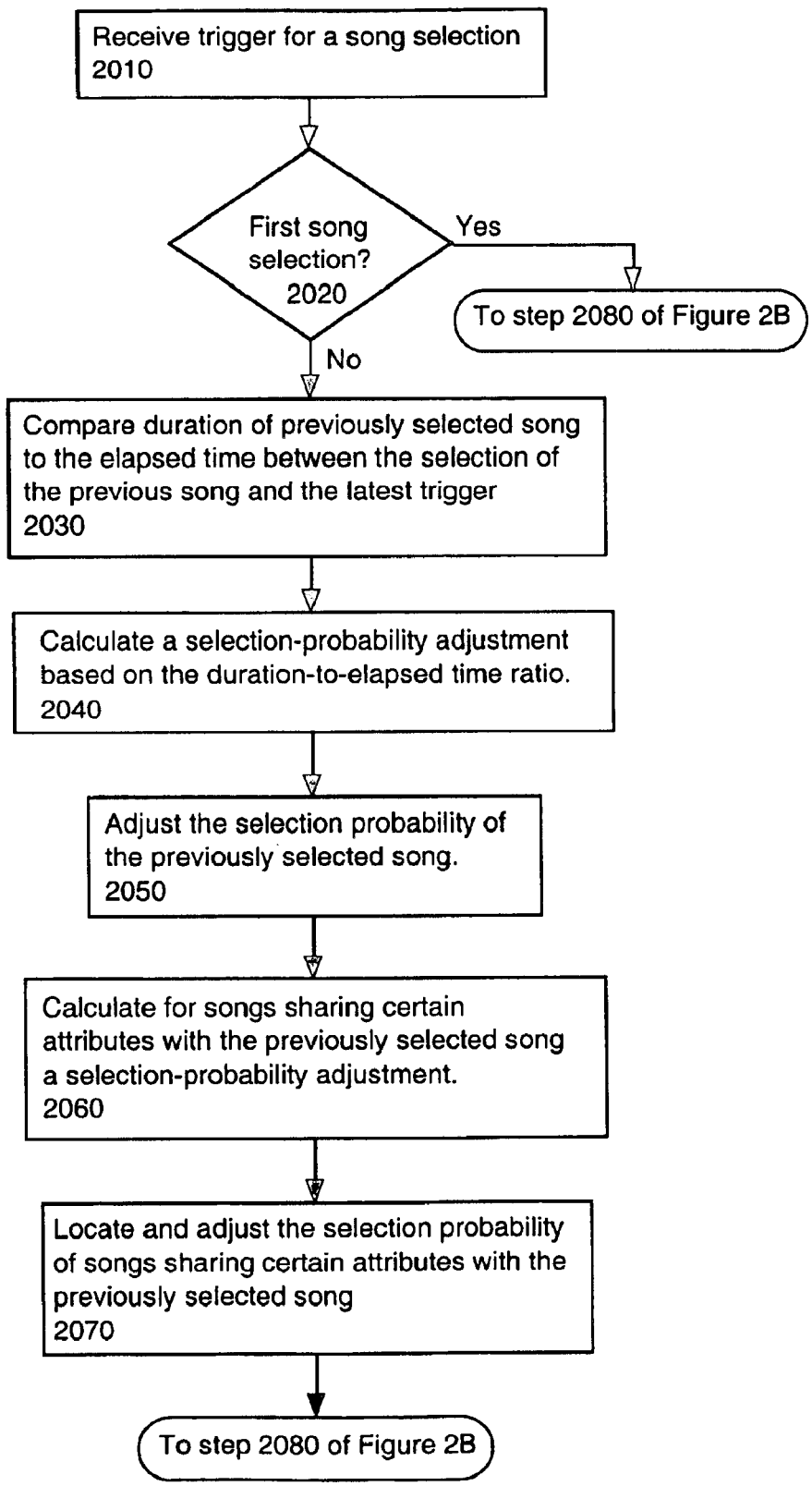
FIGS. 2A and 2B illustrates processing steps that enable the selection of an item of media in accordance with a memory intensive embodiment of the present invention.
Figure 2B:
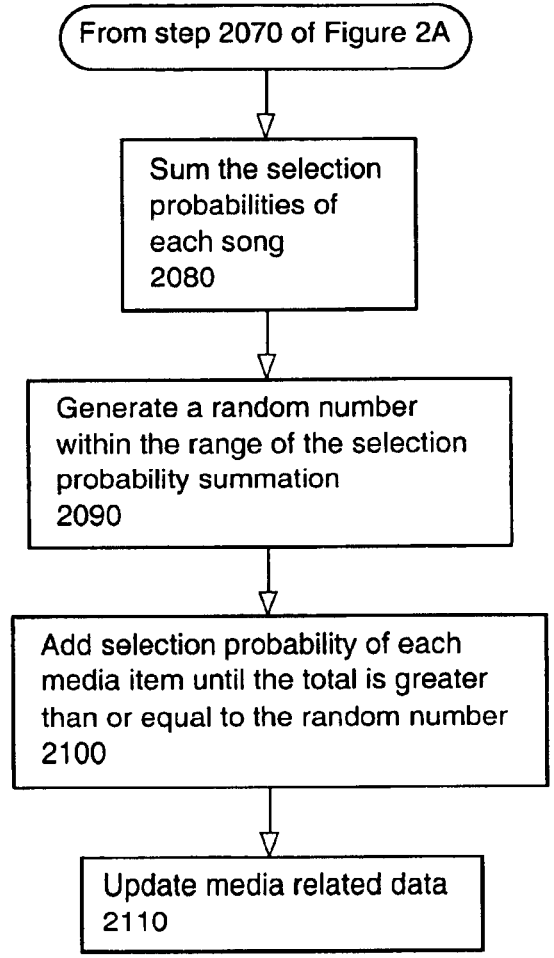
Figure 3:
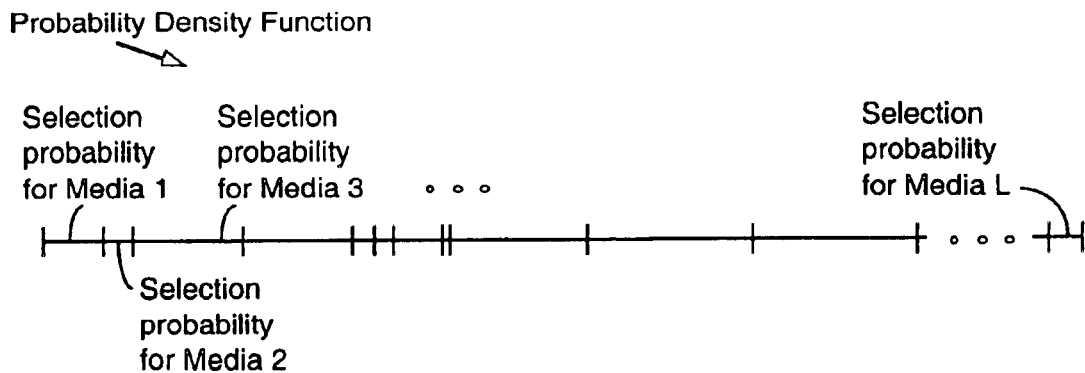
FIG. 3 schematically depicts a probability density function.

Referring to FIGS. 2A and 2B, our attention turns to a more detailed description of the media selection methodology used in this embodiment of the invention. In a first processing step, media selection logic 1008 is directed to select an item of media 1010 (step 2010, FIG. 2A). Step 2010 includes trigger 1018 responding to a depression of trigger 1018. This action creates a trigger signal that is passed from trigger 1018 and media player interface 1016 to media player 1002 via transmission channel 1020. Operating system 1006 or other technology enables the trigger signal to pass to media selection logic 1008. Step 2010 may also include media selection logic 1008 responding to a passage of time equal to a duration associated with the previously selected item of media 1010. For example, if an item of media 1010 (e.g., a song) associated with a particular duration is selected and the user does not trigger a subsequent selection in less time than this duration (e.g., allows a song to play until completion), media selection logic 1008 will automatically trigger the selection of the next item of media 1010.

In response, media selection logic 1008 determines if media selection logic 1008 is selecting an item of media for the first time or if there is no information that permits media selection logic 1008 to adjust selection probabilities of items of media 1010 (step 2020). The adjustment of selection probabilities in this embodiment of the invention is dependant upon the timing of back-to-back selections. Thus, when there is no prior selection, selection probabilities are not updated. Additionally, if there are prior selections, but media related data 1024 does not include information about these selections, selection probabilities are not updated.

When media selection logic 1008 selects an item of media for the first time or if there is no information that permits media selection logic 1008 to adjust selection probabilities (step 2020-No), control passes to step 2080, which is described below.

If not (step 2020-No), media selection logic 1008 compares the duration of the previously selected item of media (e.g., length of the song) to the elapsed time between the current selection and the previous selection (step 2030). In the particular embodiment described in FIGS. 2A–2B, this involves dividing the elapsed time between the current selection and the previous selection by the duration of the previously selected item of media 1010. From this percentage, a selection-probability adjustment is calculated (step 2040). If this percentage is not less than one (e.g., an entire song was allowed to play), a positive value is assigned to a selection-probability adjustment. The precise amount depends upon how sensitive media selection logic 1008 is configured to operate. A higher amount results in a greater response to listening to an entire song. If on the other hand this percentage is less than one (e.g., the entire song was not allowed to play), the percentage is subtracted from one, with the result of this operation multiplied by a negative value to arrive at a selection-probability adjustment. Using this formula allows for greater adjustment of a selection probability when two selections are made in rapid succession (e.g., a song was given very little time to play), which implies that the user strongly disfavors the previously selected item of media 1010. The selection-probability adjustment, whether positive or negative, is then preferably further adjusted to reflect the number of selections made by media selection logic 1008. Initially, the selection-probability adjustment is increased to adapt the selection probabilities to the preferences of the user more quickly. This increase is eventually eliminated so that the selection probabilities become more stable.

Note that in some embodiments, items of media 1010 do not have an implicit duration. For example, radio and television stations do not have a duration the way that a song or video does. In such embodiments, a default duration may be assigned to each item of media 1010. But the duration may be determined in a more complex fashion. For example, the duration of a given item of media 1010 may be the average amount of time that elapses between the selection of that item of media 1010 and a subsequent selection of an item of media 1010. In this way, the duration associated with an item of media 1010 is self correcting. Thus the selection probability of certain items of media 1010 that are typically selected for relatively short periods of time (e.g., traffic and weather related radio stations) will eventually not be adversely affected by a short selection period.

Once a selection-probability adjustment is determined, the selection probability of the previously selected item of media is adjusted accordingly (step 2050). Preferably, selection probabilities fall within a defined range. Thus, a selection probability of a song that has already reached the upper limit of the range is not increased when the song is allowed to play until completion. Similarly, a selection probability of a song that has already reached the lower limit of the range is not decreased when the song is not allowed to play until completion.

The next step is to calculate selection-probability adjustments for other items of media 4010 that are related to the previously selected item of media 1010 (step 2060). In some embodiments, media player 1002 is a portable MP3 player. Accordingly, media 1010 includes encoded songs. Well known properties of songs include the artist or band to which the song is attributed, any albums on which a song is included, or the particular genre of the song. An item of media 1010 that shares the same artist or band as the previously selected item of media 1010 is typically strongly related to the previously selected item of media 1010. However, an item of media 1010 that shares only a genre with the previously selected item of media 1010 is typically not as strongly related to the previously selected item of media 1010. One technique for determining selection probability adjustments in accordance with possible relationships is to assign a certain number of percentage points to each possible relationship. For example, 25 percentage points are assigned for having an artist or band in common, 15 percentage points are assigned for having an album in common, and 10 percentage points are assigned for having a genre in common. In this particular embodiment, the highest total percentage points available is 50. Thus, the selection probability of an item of media 1010 having all three of these attributes in common with the previously selected item of media is adjusted by half as much as the previously selected item of media. This reflects the notion that a user may feel differently about songs attributed to the same artist, included on the same album, and in the same genre.

Media selection logic 1008 then scans media related data 1024 to identify other items of media 1010 that share certain attributes with the previously selected item of media 1010 (step 2070). Once found, the selection probability of each item of media 1010 identified is adjusted in accordance with the calculations described with reference to step 2060.

In the next step, media selection logic 1008 sums the selection probability of each item of media 1010 for which data is maintained in media related data 1024 (step 2080). As noted above, each song is assigned an initial selection probability. This value is adjusted independent of the selection probability of other songs. Thus, the total of all of the selection probabilities is accurately predictable, although that total varies over time.

It is noted that the methodology described above for adjusting the selection probability of an item of media, and modifying the selection probabilities of other items of media sharing one or more media related data values, is one of a virtually infinite number of such methodologies. The present invention does not reside in and is not limited to any particular such update mechanism. Rather, the present invention is directed to an intelligent, heuristic methodology for updating selection probabilities of media items based on whether a user accepts or rejects (or appears to accept or reject) various media selections made by the media player. Over time, this improves the ability of media player 1002 to select items of media 1010 that are to the liking of a user of media player 1002.

In an alternate embodiment, the media player maintains multiple sets of selection probability values for the items of media. For instance, various sets of selection probability values might be used for selecting media during various times of the day, week and/or season. In yet another alternate embodiment, the media player may keep track of the last L items of media that the user has played to completion during a current usage session, discern a usage pattern from that information, and then use a corresponding set of selection probability values for selecting further items of media during the current usage session. By detecting a pattern of usage, such as selections of media by a particular artist or within a particular genre, and maintaining or dynamically constructing a set of selection probability values that weight similar items of media with higher probabilities, the media player's ability to select media that are to the liking of the media player's user is improved—at the expense of additional memory to store additional sets of selection probability values and usage history information, and at the expense of additional computational power to perform additional computations to support these additional heuristics.

A key element of this embodiment is the use of randomized selections to learn about user preferences. In other words, the selections are randomized, but take into account the selection probability of each item of media 1010. Therefore, once the selection probability values have been updated, media selection logic 1008 generates a random number (step 2090) within a range corresponding to the selection probability total calculated in step 2080 (e.g., a range of 0 to the selection probability total). Note that the generation of a random number may include obtaining a random number from a table of random numbers maintained in memory 1004. This random number is then mapped to one of the items of media using the selection probability values. One way to perform this mapping is to sum the selection probability of each item of media 1010 described in media related data 1024, one at a time (step 2100). After each selection probability is added to the sum, the total is compared to the random number generated in step 2090. If the sum is equal to or exceeds the random number, media selection logic 1008 selects the song associated with the portion of the media related data 1024 that provides the final selection probability. An equivalent way to perform this mapping is to map the selection probability values into a probability density function, schematically depicted in FIG. 3. The probability density function has an input value that ranges between two values, such as 0 and 1, or between first and second values whose difference is equal to the selection probability total calculated in step 2080. Each item of media having a non-zero selection probability occupies a portion of the input value range in proportion to its selection probability. The random number generated in step 2090 is mapped by the probability density function to an item of media.

Steps 2090 and 2100 may be described mathematically as follows:

Let $$SP = \sum_{i=0}^{L} SP_i,$$

where

L is the number of items of media, i∈{0,L}, $SP_i$ is the selection probability of an item of media, and SP is the total of the selection probabilities.

Let $SPN_i = SP_i \div SP$, where $SPN_i$ is the normalized selection probability of an item of media.

Therefore, $$\sum_{i=0}^{L} SPN_i = 1$$

The mapping is therefore obtained by solving for the smallest value of x to satisfy the following equation:

$$\sum_{i=0}^{x} SPN_i \geq r,$$

where $0 \leq r \leq 1$, and x is an index into media 1010.

Once an item of media is selected, the media related data is optionally updated (step 2110), for instance to keep track of the most recently selected items of media.

In another embodiment of the invention, selection probabilities are not explicitly maintained in media related data 1024. Instead, media selection logic 1008 selects an item of media 1010 on the basis of an analysis of selection history information and other information included in media related data 1024. This information may include, for instance, the date and time and duration of previous selections of identified items of media. In particular, the analysis of the information preferably includes consideration of the timing of back-to-back selections. In other words, whether the duration of an item of media selected in a first media 1010 item selection is less then the time lapse between the first media 1010 item selection and a second media 1010 item selection. As with the embodiment described above, this information provides insight into which items of media are favored or disfavored by the user. Media selection logic 1008 preferably scans this data for patterns in the initiation of media 1010 item selections as well. For example, determining that in the context of a portable MP3 player embodiment of the present invention, hard rock is usually rejected in the morning. Further, media selection logic 1008 preferably considers recent media 1010 item selections so that near term repetition is avoided. Based on an analysis of this information, media selection logic 1008 maps the items of media to a probability density function as described above.

In some embodiments the media related data 1024 includes a list 1032 (FIG. 1) of the N most recently selected media, where N is an integer such as 1, 3, 5 or 10. The media selection logic 1008 may be configured to avoid selecting any of the media included in this list 1032. For instance, in step 2100 of FIG. 2B, or step 3030, the items of media in the list of most recently selected media may be excluded from the mapping of a random number to an item of media.

In still another aspect of the present invention, media 1010 and media related data 1024 are updated via comm. port 1026. More specifically, media related data 1024 is scanned to determine which items of media 1010 are most disfavored by the user. For example, items of media that consistently result in the user initiating a subsequent selection in less time than the duration of the selected item of media 1010 are identified. These items of media 1010 are then removed from memory 1004. Further, media related data 1024 is communicated through comm. port 1026 to a separate device that has access to additional items of media 1010. Media related data 1024 is scanned by the separate device to determine if any items of media not included in media 1010 but related to favored items of media 1010 are available for downloading to the media player. If so, these additional items of media and related data (e.g., songs, song artist, song album(s), song genre, etc.) are communicated through comm. port 1026 to media player 1002 and stored in memory 1004. Using this embodiment of the invention automated updates of media player 1002 upon connection to a separate device configured to operate in conjunction with media player 1002 are possible.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, in the embodiment described with reference to FIGS. 2A and 2B and similar embodiments, a positive probability-selection adjustment is a percentage instead of an integer. This percentage is multiplied by the difference between a predefined maximum selection probability and the actual selection probability of a given item of media 1010. The result is the basis for a new selection probability. In one example, a selection plays until completion, the probability-selection adjustment is 20%, the maximum selection probability is 100, and the current selection probability is 80. The adjustment of the selection probability is as follows: adjusted selection probability=80+0.2*(100−80)=84. In another example, the probability-selection adjustment is 20%, the maximum selection probability is 100, and the selection probability is 40 so that the adjustment is as follows: adjusted selection probability=80+0.2*(100−40)=52. Thus in these examples, the selection-probability adjustment affects the selection probability less as the selection probability approaches a selection probability limit. Similarly, a negative probability-selection adjustment may be a percentage that is multiplied by the difference between a predefined minimum selection probability and the actual selection probability of a given item of media 1010. In one example, a selection not play until completion, the probability-selection adjustment is 15%, the minimum selection probability is 0, and the selection probability is 50. The adjustment of the selection probability is as follows: adjusted selection probability=50−0.15*(50−0)=42.5.

In another example of an alternative embodiment, media selection logic 1008 is configured to utilize a media-item-selection list to initially make media item selections. Without the media-item-selection list, the above described embodiments begin with a completely random selection since no media related data 1024 is available for analysis. The media-item-selection list provides a means for selecting an item of media 1010 that is not entirely random. Once sufficient media related data 1024 is available, the media-item-selection list is not necessary.

Nevertheless, certain embodiments subsequently utilize a media-item-selection list to affect the selection of items of media 1010. This is of particular importance when a user develops new interests. For example, if a user historically rejected country music, the selection probability of songs in the country music genre would most likely be very low. But if the user develops an interest in country music, a song play list favoring country music may be introduced to skew the song selection process in favor of those songs included in the song play list. In some embodiments, the song play list is processed to directly affect the selection probability of songs included in the play list. In other words, the play list is scanned, and the selection probability of the songs included in the play list are adjusted accordingly. In other embodiments, the selection probability of the songs included in the play list are not adjusted directly. Instead, the song play list merely increases the likelihood of the songs included in the play list being selected. This may be accomplished for example by treating the songs included on the play list as if the selection probability of each is higher than it actually is when mapping the selection probabilities to a probability density function. This provides the user with an opportunity to allow the songs on the play list to play until completion, which would cause the selection probability of the song and related songs to be increased.

In another embodiment, the media selection module 1008 generates a list 1034 of favorite media over time, for instance based on the user consistently playing the media in the list to completion. The media selection module 1008 is further configured to select a media item from the favorites list under predefined conditions. Examples of predefined conditions include: the user has rejected the last R selections in a row (by pressing the trigger button shortly after the selection of each of the R selection; the user quickly presses the trigger button S (e.g., three) times to indicate that he/she wants to play a next item from the favorites list; the current time is within a particular time interval (e.g., between 10 PM and 5 AM).

In still another embodiment, media selection logic 1008 is configured to adjust items of media 1010 implicitly disfavored by the user. That is, a demonstrated interest in one type of media implies a lack of interest in another. As an example, consider an embodiment in which media player 1002 is a portable MP3 player that includes encoded songs. As noted above, a well known property of songs is the particular genre of the song. If the user allows a song from the country music genre to play until completion, there is a certain probability that the user does not favor rap or heavy metal music. Thus, the selection probability of songs in these two genres of music are reduced accordingly. This process may be implemented by maintaining in association with each song genres, artists, or albums most likely disfavored when the associated song is favored. Alternatively, such information may be maintained separately and applied generally to songs with defined genres, albums, and artists.

In another embodiment of the present invention, media player 1002 is configured to enter into a fast-program mode. In this mode, the duration associated with each item of media is reduced to a minimal amount (e.g., 10 seconds). After an initial selection by media selection logic 1008, the user indicates his or her dissatisfaction with the selection by triggering another selection in less than the minimal amount of time. Otherwise, the user does nothing and allows media selection logic 1008 to select the next item of media 1010 when this minimal amount of time elapses. The selection probability of items of media 1010 selected in this mode and related items of media 1010 are preferably adjusted as described above. Additionally, media selection logic 1008 may utilize a special media-item-selection list maintained in media related data 1024 to ensure the selection of a wide range of media item types. By reducing the amount of time associated with each item of media to this minimal amount, the user can program or train the media player 1002 to suit the user's tastes in a minimal amount of time.

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention is described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A media player and media player interface, the media player comprising:
    a storage unit for storing media and media related data, said media related data including a selection probability for each item of a plurality of items of said media, wherein said selection probability is, at least in part, determined based on a time of selection of an item and/or a time between the selection of at least two items; and
    media selection logic, wherein the media selection logic is responsive to said media player interface;
    the media player interface comprising a trigger mechanism, coupled to the media selection logic, wherein said trigger mechanism enables a user to trigger the selection of media by said media selection logic;
    the media selection logic configured to;
    select an item of said media by reference to said media related data; and
    update said media related data in accordance with the selection of the item of media by the media selection logic.

2. The media player and media player interface of claim 1, wherein said media player interface is disposed on a unit separate from said media player.

3. The media player and media player interface of claim 2, wherein the unit is a remote control, said remote control configured to transmit commands from said trigger to said media player.

4. The media player and media player interface of claim 1, wherein the media selection logic is configured to select an item of media in response to a lapse in time not less than a duration associated with a previously selected item of media.

5. The media player and media player interface of claim 1, wherein
    said media selection logic is configured to maintain in said media related data a preferred media list including each selected item of said media meeting predefined selection criteria;
    said media selection logic is configured to:
        access the preferred media list when predefined preferred media mode selection criteria are satisfied; and
        select an item of said media from the preferred media list.

6. The media player and media player interface of claim 1, wherein the media selection logic is configured to:
    sum the selection probabilities for all items of media;
    generate a random number, said random number falling between first and second values whose difference corresponds to the sum of the selection probabilities for all items of media;
    repeat the following steps until an item of said media is selected:
        add the selection probability for an item of said media to a second sum initialized to the first value;
        compare the second sum to the random number; and
        select the item of said media if the second sum exceeds the random number.

7. The media player and media player interface of claim 1, wherein the media selection logic is configured to:
    map the items of media to a probability density function, each respective item of media being mapped to a respective interval of said probability density function;
    generate a random number;
    determine an interval on said probability density function corresponding the random number, and determining the item of media corresponding to the determined interval.

8. The media player and media player interface of claim 1, wherein the items of media include a plurality of recordings of musical compositions.

9. The media player and media player interface of claim 1, wherein the media is radio such that an item of said media is a radio station.

10. The media player and media player interface of claim 1, wherein the media is television such that an item of said media is a television station.

11. The media player and media player interface of claim 1, wherein the media is film such that an item of said media is a movie.

12. The media player and media player interface of claim 1, wherein the media selection logic is configured to utilize a media item selection list for an initial selection of an item of said media.

13. The media player and media player interface of claim 1, wherein the media selection logic is configured to delete from the storage unit an item of said media for which a probability of a being selected is below a predefined threshold.

14. The media and media player interface of claim 13, wherein
    the media player includes a communication port, said communication port configured to transfer media and media related data; and
    said media selection logic is configured to:
        transfer media related data from the media player via the communication port, said media related data indicating the probability of selection for each item of said media maintained in the storage unit; and
        receive in response additional items of media selected in accordance with the transferred media related data.

15. The media player and media player interface of claim 14, wherein
    the additional items of media are related to items of media that have a high probability of being selected and are already maintained in the storage unit.

16. The media player and media player interface of claim 1, wherein said media selection logic is configured to store a list of recently selected items of media and to select an item of media that is not included in the list of recently selected items of media.

17. A media player and media player interface,
    the media player comprising:
        a storage unit for storing media and media related data, said media related data including a selection probability for each item of a plurality of items of said media; and
        media selection logic, wherein the media selection logic is responsive to said media player interface;

the media player interface comprising a trigger mechanism, coupled to the media selection logic, wherein said trigger mechanism enables a user to trigger the selection of media by said media selection logic;

the media selection logic configured to:
  select an item of said media by reference to said media related data;
  update said media related data in accordance with the selection of the item of media by the media selection logic;
  determine a duration associated with a first selected item of said media;
  ascertain an amount of time that lapses between a selection of the first selected item of media and a selection of a second selected item of said media; and
  adjust by a first amount the selection probability associated with the first selected item of media by reference to a ratio of said duration to said amount of time that lapses.

18. The media player and media player interface of claim 17, wherein
  said media related data includes descriptive information for each item of said media; and
  said media selection logic is configured to increase by a second amount the selection probability of a third item of said media having a certain portion of the descriptive information in common with the first selected item of said media.

19. The media player and media player interface of claim 18, wherein said descriptive information comprises media genre information.

20. The media player and media player interface of claim 18, wherein said descriptive information comprises media collection information.

21. The media player and media player interface of claims 18, wherein said descriptive information comprises media creator information.

22. The media player and media player interface of claim 18, wherein said descriptive information comprises media creator information, media collection information, and media genre information; and
  said media selection logic is configured to size the second amount by reference to which portion of the descriptive information the third item of media has in common with the first selected item of media.

23. The media player and media player interface of claim 22, wherein the second amount is greater when the third item of media has media creator information in common with the first selected item of media than when the third item of media has only a media collection or media genre information in connection with the first selected item of media.

24. The media player and media player interface of claim 23, wherein the second amount is greater when the third item of media has media collection information in common with the first selected item of media than when the third item of media has only media genre information in common with the first selected item of media.

25. The media player and media player interface of claim 17, wherein
  said media related data includes descriptive information for each item of said media; and
  said media selection logic is configured to decrease by a second amount the selection probability of a third item of said media not having a certain portion of the descriptive information in common with the first selected item of said media.

26. The media player and media player interface of claim 25, wherein said descriptive information comprises media genre information.

27. The media player and media player interface of claim 25, wherein said descriptive information comprises media collection information.

28. The media player and media player interface of claim 25, wherein said descriptive information comprises media creator information.

29. The media player and media player interface of claim 25, wherein said descriptive information comprises media creator information, media collection information, and media genre information; and
  said media selection logic is configured to size the second amount by reference to which portion of the descriptive information the third item of media has in common with the first selected item of media.

30. The media player and media player interface of claim 29, wherein the second amount is greater when the third item of media has media creator information in common with the first selected item of media than when the third item of media has only media collection or media genre information in common with the first selected item of media.

31. The media player and media player interface of claim 30, wherein the second amount is greater when the third item of media has media collection information in common with the first selected item of media than when the third item of media has only media genre information in common with the first selected item of media.

32. The media player and media player interface of claim 17, wherein the probability of the first selected item of media being selected again is reduced if the amount of time that lapses is less than the duration associated with the first selected item of media.

33. The media player and media player interface of claim 32, wherein a reduction in the selection probability of the first selected item of media corresponds to an extent to which the amount of time that lapses is less than the duration associated with the first selected item of media.

34. The media player and media player interface of claim 17, wherein the probability of the first selected item of media being selected again is increased if the amount of time that lapses is not les than the duration associated with the first selected item of media.

35. The media player and media player interface of claim 17, wherein the first amount is inversely proportional to a number of items the selection probability of the first selected item of media.

36. The media player and media player interface of claim 17, wherein
  said media selection logic is configured to maintain in said media related data a list including each selected item of said media for which the amount of time that lapses between a selection of said each selected item of said media and a subsequent selection of an item of said media is not less than the duration associated with said each selected item of said media;
  said media selection logic is configured to:
    access the list when the amount of time that lapses is not less than the duration associated with the first selected item of media; and
    select an item of said media, other than the first selected item of media, from the list.

37. A computer program product for use in conjunction with a computer controlled media player, the computer controlled media player capable of executing a procedure, the computer controlled media player including a storage unit for storing media and media related data, the computer program product comprising a computer readable storage medium and a computer program mechanism embedded therein, comprising:

a media selection module, responsive to trigger signals received from an interface of the media player, including:

instructions for selecting items of the media, in response to the trigger signals, by reference to said media related data;

instructions for updating the media related data in accordance with the selection of the items of media by the media selecting instructions; and wherein the media related data includes a selection probability for each item of a plurality of items of said media, wherein said selection probability is at least in part determined based on a time of selection of an item and/or a time between the selection of at least two items.

38. The computer program product of claim 37, wherein the media selection module includes instructions to:

select an item of media in response to a lapse in time not less than a duration associated with a previously selected item of media.

39. The computer program product of claim 37, wherein the media selection module includes instructions to maintain in said media related data a preferred media list including each selected item of said media meeting predefined selection criteria;

the media selection module includes instructions to:

access the preferred media list when the predefined preferred media mode selection criteria are satisfied; and select an item of said media from the preferred media list.

40. The computer program product of claim 37, wherein the media selection module includes instructions to:

sum the selection probabilities for all items of media;

generate a random number, said random number falling between first and second values whose difference corresponds to the sum of the selected probabilities for all items of media;

repeat the following steps until an item of said media is selected:

add the selection probability for an item of said media to a second sum initialized to the first value;

compare the second sum to the random number; and select the item of said media if the second sum exceeds the random number.

41. The computer program product of claim 37, wherein the media selection module includes instructions to:

map the items of media to a probability density function, each respective item of media being mapped to a respective interval of said probability density function;

generate a random number;

determine an interval on said probability density function corresponding the random number, and determining the item of media corresponding to the determined interval.

42. The computer program product of claim 37, wherein the media selection module includes instructions to utilize a media item selection list for an initial selection of an item of said media.

43. The computer program product of claim 37, wherein the media selection module includes instructions to delete from the storage unit an item of said media for which a probability of a being selected is below a predetermined threshold.

44. The computer program of claim 37, wherein the media selection module includes instructions to store a list of recently selected items of media and to select an item of media that is not included in the list of recently selected items of media.

45. A computer program product for use in conjunction with a computer controlled media player, the computer controlled media player capable of executing a procedure, the computer controlled media player including a storage unit for storing media and media related data, the media related data including a selection probability for each item of a plurality of items of said media, the computer program product comprising a computer readable storage medium and a computer program mechanism embedded therein, comprising:

a media selection module, responsive to trigger signals received from an interface of the media player, including:

instructions for selecting items of the media, in response to the trigger signals, by reference to said media related data;

instructions for updating the media related data in accordance with the selection of the items of media by the media selecting instructions;

instructions for determining a duration associated with a first selected item of said media;

instructions for ascertaining an amount of time that lapses between a selection of the first selected item of media and a selection of a second selected item of said media; and instructions for adjusting by a first amount the selection probability associated with the first selected item of media by reference to a ratio of said duration to said amount of time that lapses.

46. The computer program product of claim 45, wherein the media related data includes descriptive information for each item of said media; and the media selection module includes instructions to increase by a second amount the selection probability of a third item of said media having a certain portion of the descriptive information in common with the first selected item of said media.

47. The computer program product of claim 46, wherein said descriptive information comprises media genre information.

48. The computer program product of claim 46, wherein said descriptive information comprises media collection information.

49. The computer program product of claim 46, wherein said descriptive information comprises media creator information.

50. The computer program product of claim 46 wherein said descriptive information comprises media creator information, media collection information, and media genre information; and the media selection module includes instructions to size the second amount by reference to which portion of the descriptive information the third item of media has in common with the first selected item of media.

51. The computer program product of claim 50 wherein the second amount is greater when the third item of media has media creator information in common with the first selected item of media than when the third item of media has only a media collection or media genre information in common with the first selected item of media.

52. The computer program product of claim 51, wherein the second amount is greater when the third item of media has media collection information in common with the first selected item of media than when the third item of media has only media genre information in common with the first selected item of media.

53. The computer program product of claim 45, wherein
the media related data includes descriptive information for each item of said media; and
the media selection module includes instructions to decrease by a second amount the selection probability of a third item of said media not having a certain portion of the descriptive information in common with the first selected item of said media.

54. The computer program product of claim 53, wherein said descriptive information comprises media genre information.

55. The computer program product of claim 53, wherein said descriptive information comprises media collection information.

56. The computer program product of claim 53, wherein said descriptive information comprises media creator information.

57. The computer program product of claim 53, wherein said descriptive information comprises media creator information, media collection information, and media genre information; and
the media selection module includes instructions to size the second amount by reference to which portion of the descriptive information the third item of media has in common with the first selected item of media.

58. The computer program product of claim 57, wherein the second amount is greater when the third item of media has media creator information in common with the first selected item of media than when the third item of media has only a media collection or media genre information in common with the first selected item of media.

59. The computer program product of claim 58, wherein the second amount is greater when the third item of media has media collection information in common with the first selected item of media than when the third item of media has only media genre information in common with the first selected item of media.

60. The computer program product of claim 45 wherein the probability of the first selected item of media being selected again is reduced if the amount of time that lapses is less than the duration associated with the first selected item of media.

61. The computer program product of claim 60, wherein a reduction in the selection probability of the first selected item of media corresponds to an extent to which the amount of time that lapses is less than the duration associated with the first selected item of media.

62. The computer program product of claim 45, wherein the probability of the first selected item of media being selected again is increased if the amount of time that lapses is not less than the duration associated with the first selected item of media.

63. The computer program product of claim 45, wherein the first amount is inversely proportional to a number of times the selection probability of the first selected item of media.

64. The computer program product of claim 45, wherein
the media selection module includes instructions to maintain in said media related data a list including each selected item of said media for which the amount of time that lapses between a selection of said each selected item of said media and a subsequent selection of an item of said media is not less than the duration associated with said each selected item of said media;
the media selection module includes instructions to:
access the list when the amount of time that lapses is not less than the duration associated with the first selected item of media; and
select an item of said media from the first selected item of media, from the list.

\* \* \* \* \*

UNITED STATES PATENT AND TRADEMARK OFFICE
CERTIFICATE OF CORRECTION

PATENT NO.         : 7,000,188 B1
APPLICATION NO. : 09/823081
DATED                 : February 14, 2006
INVENTOR(S)       : Robert Alan Eustace It is certified that error appears in the above-identified patent and that said Letters Patent is hereby corrected as shown below:

In column 11, line 28, in Claim 1, after "to" delete ";" insert -- : --, therefor.

In column 12, line 35, in Claim 13, after "of" delete "a".

In column 12, line 37, in Claim 14, after "media" insert -- player --.

In column 13, line 38, in Claim 21, delete "claims" and insert -- claim --, therefor.

In column 13, line 54, in Claim 23, delete "connection" and insert -- common --, therefor.

In column 14, line 24, in Claim 30, after "only" insert -- a --.

In column 14, line 45, in Claim 34, delete "les" and insert -- less --, therefor.

In column 14, line 49, in Claim 35, delete "items" and insert -- times --, therefor.

In column 15, line 33, in Claim 39, after "when" delete "the".

In column 15, line 44, in Claim 40, delete "selected" and insert -- selection --, therefor.

In column 16, line 2, in Claim 43, after "of" delete "a".

In column 16, line 2, in Claim 43, delete "predetermined" and insert -- predefined --, therefor.

In column 16, line 4, in Claim 44, after "program" insert -- product --.

UNITED STATES PATENT AND TRADEMARK OFFICE
CERTIFICATE OF CORRECTION

PATENT NO. : 7,000,188 B1
APPLICATION NO. : 09/823081
DATED : February 14, 2006
INVENTOR(S) : Robert Alan Eustace It is certified that error appears in the above-identified patent and that said Letters Patent is hereby corrected as shown below:

In column 17, line 42, in Claim 59, after "item of" insert -- media has --.

Signed and Sealed this

First Day of September, 2009

David J. Kappos
*Director of the United States Patent and Trademark Office*